Feb. 18, 1941.    F. NIESEMANN    2,232,130
FLUID PRESSURE REGULATOR
Filed July 23, 1934    2 Sheets-Sheet 1
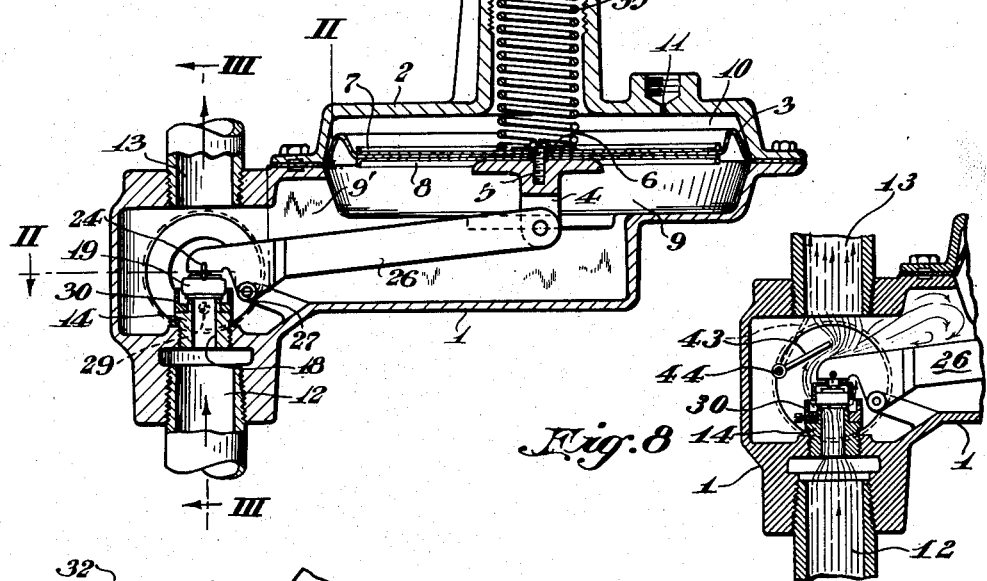
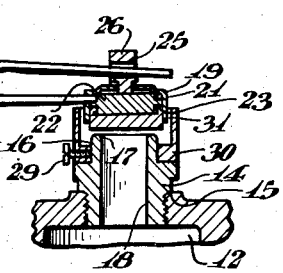
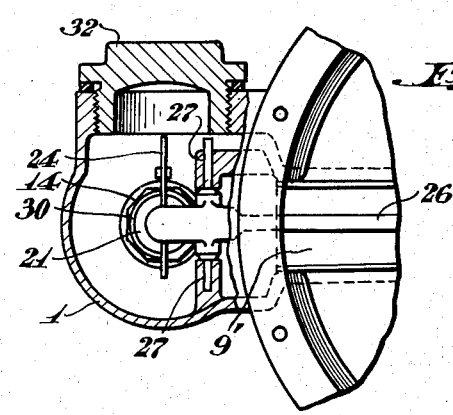
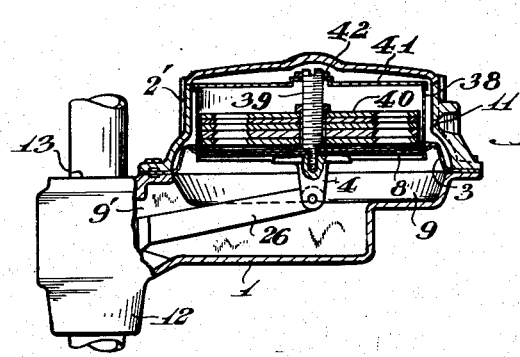
INVENTOR.
Fritz Niesemann.
BY
Strauch & Hoffman
ATTORNEYS Feb. 18, 1941.  F. NIESEMANN  2,232,130

FLUID PRESSURE REGULATOR

Filed July 23, 1934  2 Sheets-Sheet 2

INVENTOR.
Fritz Niesemann.
BY
Strauch & Hoffman
ATTORNEYS

Patented Feb. 18, 1941

2,232,130

UNITED STATES PATENT OFFICE 2,232,130

FLUID PRESSURE REGULATOR

Fritz Niesemann, Pittsburgh, Pa., assignor to Pittsburgh Equitable Meter Company, Pittsburgh, Pa., a corporation of Pennsylvania Application July 23, 1934, Serial No. 736,595

1 Claim. (Cl. 50—27)

The present invention relates to methods and apparatus for regulating gas pressures, and more particularly to methods and apparatus for regulating pressures in response to changes in flow in the type of apparatus commonly known to the trade as service regulators.

In certain weight loaded or spring loaded regulators of this type as heretofore constructed, as the flow through the regulator increases, the outlet pressure drops, this drop being caused among other things, by change in effective area of the diaphragm, the impact effect of the gas, and the swirling and internal losses of the gas in passing from the regulator body into the line; and in the spring loaded type, a further drop is caused by expansion of the spring which changes the spring load on the diaphragm. However, regulators of this type are intended to keep the outlet pressure constant within the whole range of the capacity of the regulator, and in some cases it is desired even to increase the outlet pressure with increased rate of flow to compensate for line pressure drop between the regulator and point of application of the gas.

This tendency of the outlet pressure to fall off heretofore has been overcome by using a suitable loading or boosting device in which the regulator chamber is sealed from the valve, the valve operating means passing through a relatively loose stuffing box or small sealing diaphragm, and a differential pressure creating device in the outlet of the regulator is connected with the diaphragm chamber. However, such devices are complicated, expensive to manufacture and too costly for use on small sized pipe lines where simplicity of construction is very desirable.

Further, unless the regulator is properly designed there is a tendency of the diaphragm to pulsate and cause rapid fluctuations in the rate of flow from the outlet.

According to the present invention, the regulator chamber is connected to the outlet of the regulator, and the incoming gas to the regulator is directed at a relatively high non-swirling velocity through the regulator chamber into the outlet pipe of the regulator thereby aspirating the regulator chamber, and the movement of the regulator to maintain the pressure constant in the regulator chamber further opens the valve thereby causing a higher outlet pressure of the regulator or loading of the line pressure. The flow capacity of the regulator also is increased.

It is my theory that the non-confined flow of gas in the space between the inlet and outlet of the regulator assumes the form of a streamline flow with a vena contracta similar to the flow in a Venturi tube, and the aspirating effect is due to the high velocity at the vena contracta.

Another possible theory is that the inner film of gas adheres or clings to the surface of the valve as it passes therealong from the inlet to the outlet, the suction effect in the outlet preventing excessive spreading of the outer film of the gas stream so as to produce an aspirating effect. According to this theory it is necessary only to guide, direct or induce the gas to flow along one surface only, such as the valve surface, the gas being maintained in its direction of flow by adhesion to the valve surface causing it to assume a stream line flow. This unconfined stream line flow, whatever may be the theoretical explanation thereof, I call a directed unconfined flow. However, I do not wish to be confined to this theory in claiming my invention. With my construction it is not necessary to shape the walls of the space between the inlet and outlet of the regulator to confine the gas to a Venturi form, and consequently this space becomes a part of the regulator chamber, and the valve operating means can be passed through the regulator chamber without the use of a stuffing box or other sealing means to separate the regulator chamber from the inlet or outlet.

Where a spring is employed for loading the diaphragm in a regulator designed according to my invention, the spring load on the diaphragm is decreased because of the expansion of the spring which follows the travel of the diaphragm. I overcome this decrease in spring load by using a spring designed so that its change in length produces a relatively small change in the pressure exerted thereby on the diaphragm. The tendency of the diaphragm to pulsate is overcome by providing a damping air chamber or relatively small volume on the side opposite the regulator chamber with a relatively small vent therefor. Further, I employ a valve seating material which has the required toughness to resist cutting by the valve and is soft enough to provide complete shut off at relatively low closing pressures.

In the preferred embodiment of the invention I provide a regulator having its inlet and outlet in substantial alignment and a valve assembly wherein the valve is surrounded by a fixed sleeve which terminates short of the outlet and gives to the incoming gas its form and directs it into the outlet pipe. The diaphragm chamber is directly connected to the space between the inlet and outlet which forms a part thereof and is aspirated by the gas flowing therethrough. This aspiration of the diaphragm chamber increases with increase in flow and thereby permits further movement of the diaphragm in the direction to open the valve.

The aerodynamically designed sleeve of this invention can be applied to regulators already in use whereby such regulators will operate to increase the outlet pressure with increased rate of flow and it is within the scope of my present invention to modify existing regulators by the addition of this novel sleeve.

The valve is fully opened when the valve closure is at a distance from the valve seat of about one-fourth the diameter of the inlet orifice, and the movement of the diaphragm therefore is this distance times the leverage connecting the diaphragm to the valve. The spring employed for loading the diaphragm has such properties that a change in elongation of the spring equal to the movement of the diaphragm between full open and full closed positions of the valve causes a change in loading effect of the spring within the limit of boost caused by the aspirator effect in the regulator. In this way the outlet pressure may be maintained constant or an actual boost in outlet pressure can be accomplished. The spring is initially compressed to provide a fixed minimum or initial load on the diaphragm, and the length of the compressed spring is such as to provide for adjustment of outlet pressures over a wide range while maintaining the spring load on the diaphragm within the limits of boost of the regulator. The stiffer the spring the greater the range of adjustment possible within certain limits.

In the spring loaded type pulsation is eliminated by having the cover closely conform to the diaphragm thereby providing a small air chamber for damping which has a small vent to the atmosphere. In the weight loaded type of regulator this is not feasible because it often is desired to change the number of weights. Accordingly, in this type I provide a cover for the weights and the cover for the diaphragm closely conforms to the weight cover. In this way a change in the number of weights does not change the damping effect.

Accordingly, it is an object of the present invention to provide a method of regulating pressures to overcome the tendency for the outlet pressure to drop with increase in load, by passing gas at a relatively high velocity through the regulator chamber into the outlet to produce an aspirator effect tending to lower the pressure in the regulator chamber.

Another object is the provision of an apparatus regulating gas pressures in which means is provided for passing gas at a relatively high velocity through the regulator chamber into the outlet in a form to produce an aspirator effect tending to lower the pressure in the regulator chamber.

Another object is the provision of a regulator having an increased flow capacity.

A further object is the provision of a regulator having a large direct connection with the outlet, thereby eliminating sealing means between the diaphragm chamber and outlet.

A further object is the provision of a damping air chamber over the diaphragm of relatively small volume and having a relatively small vent to the atmosphere to prevent pulsation of the diaphragm.

Still another object is the provision of a spring loaded regulator in which the spring has a small change in loading effect through the range of operative elongation.

Still another object is the provision of a valve seat having the required degree of toughness and softness to give complete closing of the valve over a long period of time.

Still another object of my present invention is the provision of a novel valve assembley comprising an aerodynamically designed sleeve which can be applied to regulators already in use to improve the operating characteristics of such regulators so that in operation, the supply pressure will increase with an increased rate of flow.

Other objects of the present invention are to provide a pressure regulator responsive to flow conditions which is of simple design, inexpensive to manufacture and is efficient in operation. Other objects will be apparent from a consideration of the following description taken in connection with the annexed drawings in which:

Figure 1 shows a preferred embodiment of my invention in vertical section;

Figure 2 is a fragmentary section view of the casing on line II—II of Figure 1, the lever and valve being shown in elevation;

Figure 3 is an enlarged section of the valve and seat taken on line III—III of Figure 1;

Figure 6 shows a vertical section of a modification of my invention using loading weights.

Figure 8 is a fragmentary view in section showing an adjustment.

Figures 9 and 10 are detail views of a modified form of adjustment.

Figure 4:
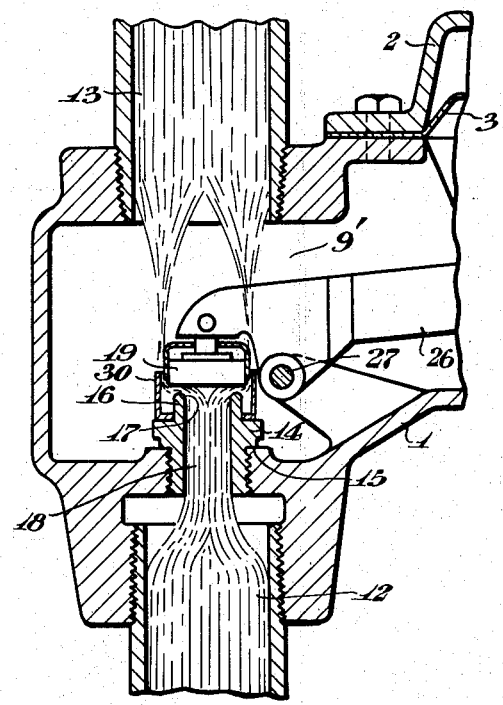
Figure 4 is a diagrammatic enlarged view of a regulator having my invention applied thereto, the valve being shown in open position and the flow of the fluid being indicated.

Referring to Figure 1 of the drawings, the pressure regulator in its general construction is of well known form and comprises a lower shell or casing 1 and a cover 2 detachably secured thereto by bolts or similar means. A flexible diaphragm 3 is clamped at its periphery between the cover and lower casing and an attachment lug 4 is secured thereto by a screw 5 passing through the diaphragm 3, the washer 6 and plates 7 and 8 in well known manner. The bottom chamber 9 is subject to the outlet pressure of the gas, and the upper chamber 10 is vented to the atmosphere by a small vent hole 11. The cover 2 leaves a relatively small air space above the diaphragm, and in conjunction with the small vent hole effectively damps or prevents pulsation of the diaphragm.

The lower shell is tapped and threaded to provide an inlet connection 12 and an outlet connection 13, the outlet connection being in constant communication with the regulator chamber 9 through a suitable large lateral passage 9' which may be considered as part of the regulator chamber. A valve assembly comprises hollow bushing or valve member 14 (Figures 1 and 3) which is threaded into the inlet until sealing shoulder 15 is abutted. The valve member 14 has a reduced portion 16 which is tapered at its end to provide a sharp edge 17, and it will be seen that in the open position gas flows through inlet 12 and valve orifice or passage 18 of the valve member and out through outlet 13.

The passage 18 is adapted to be closed or throttled by a valve seat member 19 of the valve assembly comprising a cup like shell 21 within which is secured the valve seat. This seat comprises a disc 22 of steel or other suitable material having an undercut groove 23 and a seat of "paraprene" is vulcanized thereto and inserted in the shell 21, and is retained in place by striking out or punching the metal cup 21 opposite the undercut portion, or in any other suitable manner. "Paraprene" is an imitation or synthetic rubber product produced by polymerization of divinyl and contains sufficient mineral filler to give it a density of about 75 to 80 by durometer test. It is highly resistant to gasoline and other aliphatic hydrocarbons. A spring wire retainer 24 passes through a hole in the side of shell 21 and is coiled about the inside thereof around the steel disc which has a reduced end to accommodate the same. The opposite end of the wire is reversely bent in hair pin shape and passes through a hole 25 in lever 26 which is pivoted at 27 to the lower shell 1 and is pivotally secured at its other end to the bifurcated attaching lug 4.

A sleeve 30, forming part of the valve assembly, surrounds the valve member 14 and seat member 19 being secured thereto by a set screw 29, and is spaced sufficiently from the seat member 19 to provide an annular area 31 whereby gas can flow from the inlet 12 through the passage 9' when the valve is open. The sleeve 30 and valve member 14 may be in the form of an integral fitting if it is so desired. The annular passage 31 is substantially in alignment with the outlet 13 so that gas flows at relatively high velocity through the annular area 31, across passage 9' and into the outlet 13 thereby producing an ejector or aspirator effect within chamber 9 tending to aspirate or exhaust the same so that the actual pressure within the chamber 9 is less than the gas pressure within the outlet passage 13. It is therefore evident as shown in Figure 4 that a tubular flow of the fluid is first induced followed by an expansion of the fluid stream into the form of a solid cylindrical body. The sleeve preferably at all times projects above the bottom of the valve seat so that regardless of the amount the valve is opened the area of the annular space or inlet 31 remains nearly or substantially constant. The greater the flow of gas through the ejector sleeve 30 the lower will be the pressure in chamber 9. A threaded cap or cover 32 is located at the side of the casing and provides access to the valve member 19 and fulcrum 27 for assembling the parts.

The ring 30 may be readily applied to existing regulators, the form of mounting shown permitting such replacement to be readily made. The top of the fitting which corresponds to valve member 14 in existing regulators may be shaped to receive the ring 30, or a fitting similar to fitting 14 may be provided.

The cover 2 carries a spring 35 within a suitable recess, and an adjustment nut 36 within the sleeve is set to develop the desired pressure upon the diaphragm 3. This sleeve is adapted to be closed and sealed by a cover 37. The spring is designed so that it is initially compressed to about two-thirds of its length to provide its normal working pressure and the full adjustment range between high and low outlet pressures is made by a variation of one-third of the length of the spring.

In operation, the inlet 12 is connected to a gas main and the outlet pipe leads to a gas burner or other domestic gas consuming appliance. In the closed position of valve 14, 19, and with no gas being consumed the predetermined pressure of the spring 35 is balanced by the gas pressure in chamber 9. As soon as a burner is turned on and gas flows thereto the pressure in chamber 9 is reduced and no longer balances spring 35 whereupon the spring forces the diaphragm 3 downward, pivoting lever 26 about its fulcrum 27 and causing the seat 19 to rise and open passage 18. This permits gas to flow into the regulator chamber 9 to restore the pressure.

Figure 5:
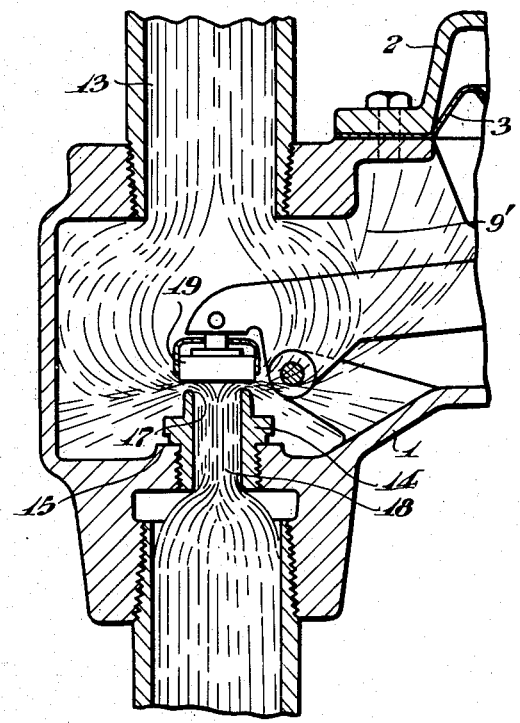
Figure 5 is a similar diagrammatic enlarged view of a regulator without the invention, the lines showing the flow of the fluid.

Referring to Figure 5, it will be seen that in the ordinary type service regulator the gas spreads out into the connecting passage 9' in more or less swirling flow, and is even apt to strike the diaphragm thereby raising the same against the action of the spring. Raising the diaphragm has the effect of reducing the outlet pressure, and thus, in this construction, the outlet pressure falls off rapidly as the flow increases. Heretofore, it was thought necessary to restrict or seal the passage 9' to prevent this action.

Referring to Figure 4, it will be seen that the gas is directed through the annular space 31 into the outlet in streamline form with a vena contracta or an expansion of the fluid stream which aspirates the chamber 9 through the passage 9'. This evacuating or aspirating effect tends to pull down on the diaphragm and increases the outlet pressure with increase of flow.

Figure 7:
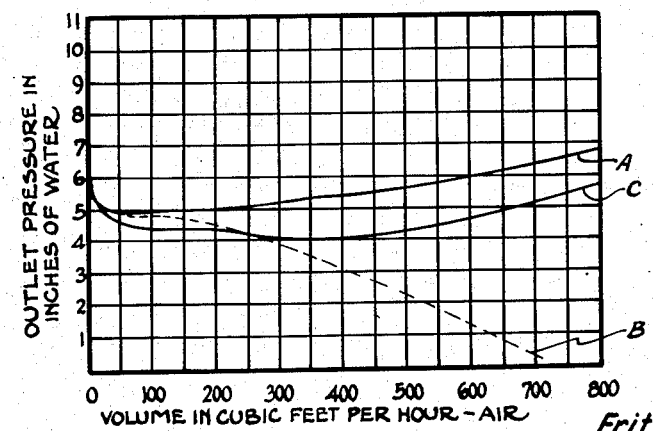
Figure 7 shows curves representing the relation of flow to outlet pressure of the regulators illustrated in Figures 4 and 5.

The action of the regulators shown in Figures 4 and 5 will be better understood by a comparison of the test curves shown in Figure 7. The regulators are identical except that the one shown in Figure 4 has the sleeve or ring 30 applied thereto. Curve A represents the outlet pressure of a ¾ inch spring type regulator employing my invention as shown in Figure 4, and curve B represents the outlet pressure of the regulator with the ring 30 removed as shown in Figure 5. Curve C represents the outlet pressure of a regulator employing the ring 30 of my invention, but spring 35 has been replaced with a spring of usual form. The outlet pressure is set for five inches of water. It will be seen from curves A and C that there is a marked difference in the outlet pressure as the volume flow increases. In curve A the outlet pressure remains close to 5" of water until the flow gets to about 250 cubic feet per hour, and then rises, whereas in curve B the outlet pressure rapidly falls after about 150 cubic feet per hour flow. Curve C is substantially parallel with curve A after the flow gets to about 400 cubic feet per hour. It will be seen from a comparison of curves A and C that the combined effect of spring 35 and ring 30 of the present invention is to shift curve C upwardly. Further, it will be seen that the capacity of the regulator shown in Figure 4 is greatly increased. Capacity is measured as the volume flow at a pressure not less than one inch below the set pressure, and according to curve B the capacity is about 280 cubic feet per hour whereas the curve A shows the capacity to be well above 800 cubic feet per hour.

In the modification shown in Figure 6, a series of weights is employed to load the regulator diaphragm. Like parts in this modification are correspondingly numbered. The diaphragm 3 is clamped between the body 1 and a cover 2' which is high enough to permit the insertion of a weight case 38 upon the diaphragm. A screw 39 passes through the weight case, the bottom of which is used to replace upper plate 7, and passes through the diaphragm 3 and lower plate 8, the attachment lug 4 being secured thereto. A plurality of weights 40 are located in the weight case for loading the diaphragm and the case is covered by a suitable friction cover 41 held in place by a nut 42 threaded on the screw 39.

It will be observed that the cover 2' closely conforms to the shape and size of the weight case 38 so as to leave a relatively small air space therebetween, and the vent 11 is also very small. The clearance at the top is just about enough to permit movement of the diaphragm with a small factor of safety in the clearance. The volume of air in this chamber is very small and the movement of the diaphragm and weight casing produces a high compression in the chamber which escapes only slowly and produces a damping action on the diaphragm movements.

The structure shown in Figure 1 is designed to give substantially the maximum pressure boost in the outlet of the regulator, and in some cases an adjustment of the amount by which the outlet pressure increases as the flow increases may be desirable. Figures 8, 9 and 10 disclose adjusting means which may be applied to the regulator of Figure 1 or the modified regulator of Figure 6.

Referring to Figure 8, a vane or shield 43 is carried by a rod or shaft 44, the latter being journalled in suitable openings in the cover 1. The shaft 44 preferably projects outside of the housing so that it can be turned to adjust the position of the vane 43. The vane 43 may be positioned by turning shaft 44 to divert part of the gas stream issuing from the ring 30 into the diaphragm chamber where it creates an impact pressure, thus lowering the amount by which the outlet pressure will increase with an increased rate of flow. When the vane 44 is rotated counterclockwise to the dotted line position, it will not interfere with the stream issuing from the ring 30.

Figures 9 and 10 disclose a similar type of adjustment where the adjustable shield or vane is mounted on the lever 26. A vane 45 is secured to the flat top of the lever 26 by a screw 46. By loosening the screw 46, the vane 45 can be set in the dotted line position to divert a part of the stream issuing from the ring 30 into the diaphragm chamber. The adjustment shown by Figures 9 and 10 can be added to the regulator in the field by substituting a lever 26 fitted with the vane 45 and the screw 46 for the lever already in the regulator.

The invention may be embodied in other specific forms without departing from the spirit or essential characteristics thereof. The present embodiment is therefore to be considered in all respects as illustrative and not restrictive, the scope of the invention being indicated by the appended claim rather than by the foregoing description, and all changes which come within the meaning and range of equivalency of the claim are therefore intended to be embraced therein.

What is claimed and desired to be secured by United States Letters Patent is:

In a fluid pressure regulator, a body having passages for inflow and outflow of fluid, a valve member within the body and having a travel of movement in opposite directions between open and closed positions to control flow of fluid through the same, a flexible diaphragm connected to the valve member for conjoint movement with the same, a rigid wall extending substantially entirely over one side of the diaphragm, a weight case carried by said diaphragm and disposed between said diaphragm and said wall, said case conforming closely in shape and size to said wall to form a confined fluid space between the wall and the case, an orifice of relatively small diameter serving to vent said space and serving to materially impede fluid flow into said space, and means forming a fluid space upon the other side of the diaphragm, said fluid space having a venting orifice of materially greater diameter than said first-named orifice to freely subject the diaphragm to pressure.

FRITZ NIESEMANN.